United States Patent
MacInnis

(10) Patent No.: US 7,565,462 B2
(45) Date of Patent: *Jul. 21, 2009

(54) MEMORY ACCESS ENGINE HAVING MULTI-LEVEL COMMAND STRUCTURE

(75) Inventor: Alexander G. MacInnis, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/945,702

(22) Filed: Nov. 27, 2007

(65) Prior Publication Data

US 2008/0133786 A1 Jun. 5, 2008

Related U.S. Application Data

(63) Continuation of application No. 10/404,074, filed on Apr. 1, 2003, now Pat. No. 7,302,503.

(60) Provisional application No. 60/369,210, filed on Apr. 1, 2002.

(51) Int. Cl.
*G06F 13/28* (2006.01)
*G06F 3/00* (2006.01)

(52) U.S. Cl. .......................... 710/22; 710/23; 710/24; 710/28; 710/52; 710/53; 710/54; 710/55; 710/56; 710/57

(58) Field of Classification Search .............. 710/22–24, 710/28, 52–57
See application file for complete search history.

(56) References Cited

U.S. PATENT DOCUMENTS

| 4,783,730 A | 11/1988 | Fischer |
| 4,807,111 A | 2/1989 | Cohen et al. |
| 5,237,661 A | 8/1993 | Kawamura et al. |
| 5,404,522 A | 4/1995 | Carmon et al. |
| 5,555,396 A | 9/1996 | Alferness et al. |
| 5,577,211 A | 11/1996 | Annapareddy et al. |
| 5,600,646 A | 2/1997 | Polomski |
| 5,634,099 A | 5/1997 | Andrews et al. |

(Continued)

OTHER PUBLICATIONS

Hatabu et al., "QVGA/CIF Resolution MPEG-4 Video Codec Based on a Low-Power and General-Purpose DSP", Signal Processing Systes, 2002, SIPS '02, IEEE Workshop on Oct. 16, 2002, XP010616570.

(Continued)

*Primary Examiner*—Tanh Q Nguyen
(74) *Attorney, Agent, or Firm*—McAndrews Held & Malloy, Ltd.

(57) ABSTRACT

A direct memory access system utilizing a local memory that stores a plurality of DMA command lists, each comprising at least one DMA command. A command queue can hold a plurality of entries, each entry comprising a pointer field and a sequence field. The pointer field points to one of the DMA command lists. The sequence field holds a sequence value. A DMA engine accesses an entry in the command queue and then accesses the DMA commands of the DMA command list pointed to by the pointer field of the accessed entry. The DMA engine performs the DMA operations specified by the accessed DMA commands. The DMA engine makes available the sequence value held in the sequence field of the accessed entry when all of the DMA commands in the accessed command list have been performed. In one embodiment, the command queue is part of the DMA engine.

20 Claims, 4 Drawing Sheets

U.S. PATENT DOCUMENTS

| | | | |
|---|---|---|---|
| 5,708,849 | A | 1/1998 | Coke et al. |
| 5,797,041 | A | 8/1998 | Yasue et al. |
| 5,809,334 | A | 9/1998 | Galdun et al. |
| 5,923,852 | A | 7/1999 | Lee et al. |
| 5,933,654 | A | 8/1999 | Galdun et al. |
| 5,968,153 | A | 10/1999 | Wheeler et al. |
| 5,970,069 | A | 10/1999 | Kumar et al. |
| 6,052,387 | A | 4/2000 | Chow et al. |
| 6,070,194 | A | 5/2000 | Yu et al. |
| 6,145,016 | A | 11/2000 | Lai et al. |
| 6,167,465 | A | 12/2000 | Parvin et al. |
| 6,205,494 | B1 | 3/2001 | Williams |
| 6,212,593 | B1 | 4/2001 | Pham et al. |
| 6,314,477 | B1 | 11/2001 | Cowger et al. |
| 6,538,656 | B1 | 3/2003 | Cheung et al. |
| 6,714,553 | B1 | 3/2004 | Poole et al. |
| 6,721,320 | B1 | 4/2004 | Hoglund et al. |
| 6,738,358 | B2 | 5/2004 | Bist et al. |
| 2001/0021949 | A1 | 9/2001 | Blightman et al. |
| 2001/0049755 | A1 | 12/2001 | Kagan et al. |

OTHER PUBLICATIONS

U.S. Appl. No. 09/437,208 entitled "Graphics Display System", filed Nov. 9, 1999, Inventor: Alexander G. MacInnis et al.

U.S. Appl. No. 09/641,374 entitled "Video, Audio And Graphics Decode, Composite And Display System", filed Aug. 18, 2000, Inventor: Alexander G. MacInnis et al.

U.S. Appl. No. 09/641,936 entitled "Video And Graphics System With An MPEG Video Decoder For Concurrent Multi-Row Decoding", filed Aug. 18, 2000, Inventor: Ramanujan K. Valmiki et al.

U.S. Appl. No. 09/643,223 entitled "Video And Graphics System With MPEG Specific Data Transfer Commands", filed Aug. 18, 2000, Inventor: Ramanujan K. Valmiki et al.

U.S. Appl. No. 09/640,870 entitled "Video And Graphics System With Video Scaling", filed Aug. 18, 2000, Inventor: Alexander G. MacInnis et al.

U.S. Appl. No. 09/641,930 entitled "Video And Graphics System With A Video Transport Processor", filed Aug. 18, 2000, Inventor: Ramanujan K. Valmiki et al.

U.S. Appl. No. 09/641,935 entitled "Video And Graphics System With Parallel Processing Of Graphics Windows", filed Aug. 18, 2000, Inventor: Alexander G. MacInnis et al.

U.S. Appl. No. 09/642,510 entitled "Video And Graphics System With A Single-Port RAM", filed Aug. 18, 2000, Inventor: Xiaodong Xie.

U.S. Appl. No. 09/642,458 entitled "Video And Graphics System With An Integrated System Bridge Controller", Inventor: Alexander G. MacInnis et al.

MEMORY ACCESS ENGINE HAVING MULTI-LEVEL COMMAND STRUCTURE

PRIORITY CLAIM TO RELATED APPLICATION

This application is a continuation of U.S. patent application Ser. No. 10/404,074 (now U.S. Pat. No. 7,302,503), filed Apr. 1, 2003, which claims priority to and claims benefit from U.S. Provisional Patent Application Ser. No. 60/369,210, entitled "MEMORY ACCESS ENGINE HAVING MULTI-LEVEL COMMAND STRUCTURE" filed on Apr. 1, 2002, both of which are hereby expressly incorporated herein by reference.

INCORPORATION BY REFERENCE OF RELATED APPLICATIONS

The following U.S. patent applications are related to the present application and are hereby specifically incorporated by reference: patent application Ser. No. 10/114,679, entitled "METHOD OF OPERATING A VIDEO DECODING SYSTEM"; patent application Ser. No. 10/114,797, entitled "METHOD OF COMMUNICATING BETWEEN MODULES IN A DECODING SYSTEM"; patent application Ser. No. 10/114,798, entitled "VIDEO DECODING SYSTEM SUPPORTING MULTIPLE STANDARDS"; patent application Ser. No. 10/114,619, entitled "INVERSE DISCRETE COSINE TRANSFORM SUPPORTING MULTIPLE DECODING PROCESSES"; patent application Ser. No. 10/114,886, entitled "MEMORY SYSTEM FOR VIDEO DECODING SYSTEM"; and patent application Ser. No. 10/113,094, entitled "RISC PROCESSOR SUPPORTING ONE OR MORE UNINTERRUPTIBLE CO-PROCESSORS"; all filed on Apr. 1, 2002; patent application Ser. No. 10/293,633, entitled "PROGRAMMABLE VARIABLE LENGTH DECODER"; filed on Nov. 12, 2002; and patent application Ser. No. 10/404,387, entitled "VIDEO DECODING SYSTEM HAVING A PROGRAMMABLE VARIABLE-LENGTH DECODER"; and patent application Ser. No. 10/404,389, entitled "INVERSE QUANTIZER SUPPORTING MULTIPLE DECODING PROCESSES"; both filed on Apr. 1, 2003.

FIELD OF THE INVENTION

The present invention relates generally to direct memory access (DMA), and, more particularly, to a DMA engine having a multi-level command structure.

BACKGROUND OF THE INVENTION

Direct memory access, or DMA, is a method for direct communication from a peripheral device to memory with no programming involved. The data is moved to memory via the bus without program intervention. The only effect on the executing program is some slowing down of execution time because the DMA activity "steals" bus cycles that would otherwise be used to access memory for program execution.

DMA is a prime example of a hardware function in the chip that benefits from queued commands. There are two main aspects to this: (1) there are multiple DMA operations that need to be performed in one macroblock (MB) time interval, and (2) there are performance advantages in giving the DMA two macroblock times to complete each macroblock set of DMA operations, i.e., longer latency deadlines can help to tolerate DRAM latency. Because the DMA engine receives multiple commands in a given macroblock time interval, some form of command list is necessary for acceptable performance. There are up to (approximately) twelve DMA operations per macroblock for prediction fetches, and up to (approximately) four DMA operations per macroblock for write-backs, leading to a need for at least 16 DMA operations per macroblock. With the pipeline structured to allow two macroblock times of latency for each one macroblock set of operations, the complete list of commands is not expected to be empty at any time during normal operation. For example, commands for a first macroblock are sent to the DMA engine. Then commands for a second macroblock are sent to the DMA engine, while DMA operations for the first macroblock need not be complete yet. The first macroblock operations should be done prior to the time when the DMA commands for a third macroblock are sent to the DMA engine, while the second macroblock operations need not be done by that time. This means that it is not possible for firmware (or anything else) to determine that the DMA engine is "done" with a particular macroblock by checking to see if the entire command queue (assuming there is one) has been completed.

Further limitations and disadvantages of conventional and traditional approaches will become apparent to one of skill in the art through comparison of such systems with the present invention as set forth in the remainder of the present application with reference to the drawings.

SUMMARY OF THE INVENTION

One aspect of the present invention is directed to a direct memory access system utilizing a local memory that stores a plurality of DMA command lists, each comprising at least one DMA command. A command queue can hold a plurality of entries, each entry comprising a pointer field and a sequence field. The pointer field pointing to one of the DMA command lists. The sequence field holds a sequence value. A DMA engine accesses an entry in the command queue and then accesses the DMA commands of the DMA command list pointed to by the pointer field of the accessed entry. The DMA engine performs the DMA operations specified by the accessed DMA commands. The DMA engine makes available the sequence value held in the sequence field of the accessed entry when all of the DMA commands in the accessed command list have been performed. In one embodiment, the command queue is part of the DMA engine.

Another embodiment of the present invention is directed to a method of implementing direct memory access. According to the method, a plurality of DMA command lists are stored, each comprising at least one DMA command. A command queue is maintained. The command queue is designed to hold a plurality of entries. Each entry includes a pointer field and a sequence field. The pointer field points to one of the DMA command lists. The sequence field holding a sequence value. An entry in the command queue is accessed. The DMA commands of the DMA command list pointed to by the pointer field of the accessed entry are then accessed. The DMA operations specified by the accessed DMA commands are performed. The sequence value held in the sequence field of the accessed entry is made available when all of the DMA commands in the accessed command list have been performed.

Another embodiment of the present invention is directed to a digital media processing system including a memory element, a command queue, a media processor and a DMA engine. The memory element stores a plurality of DMA command lists, each comprising at least one DMA command. The command queue is adapted to hold a plurality of entries, each entry comprising a pointer field and a sequence field. The pointer field points to one of the DMA command lists. The sequence field holds a sequence value. The media processor is adapted to process digital media data elements. The media processor provides entries to the command queue in order to effect the performance of corresponding DMA operations. Each entry corresponds to a specified media data element. The DMA engine accesses an entry in the command queue and then accesses the DMA commands of the DMA command list pointed to by the pointer field of the accessed entry. The DMA engine performs DMA operations specified by the accessed DMA commands. The DMA engine provides the sequence value held in the sequence field of the accessed entry to the media processor when all of the DMA commands in the accessed command list have been performed.

It is understood that other embodiments of the present invention will become readily apparent to those skilled in the art from the following detailed description, wherein embodiments of the invention are shown and described only by way of illustration of the best modes contemplated for carrying out the invention. As will be realized, the invention is capable of other and different embodiments, and its several details are capable of modification in various other respects, all without departing from the spirit and scope of the present invention. Accordingly, the drawings and detailed description are to be regarded as illustrative in nature and not as restrictive.

DESCRIPTION OF THE DRAWINGS

These and other features, aspects, and advantages of the present invention will become better understood with regard to the following description, appended claims, and accompanying drawings where:

DETAILED DESCRIPTION

Figure 1:
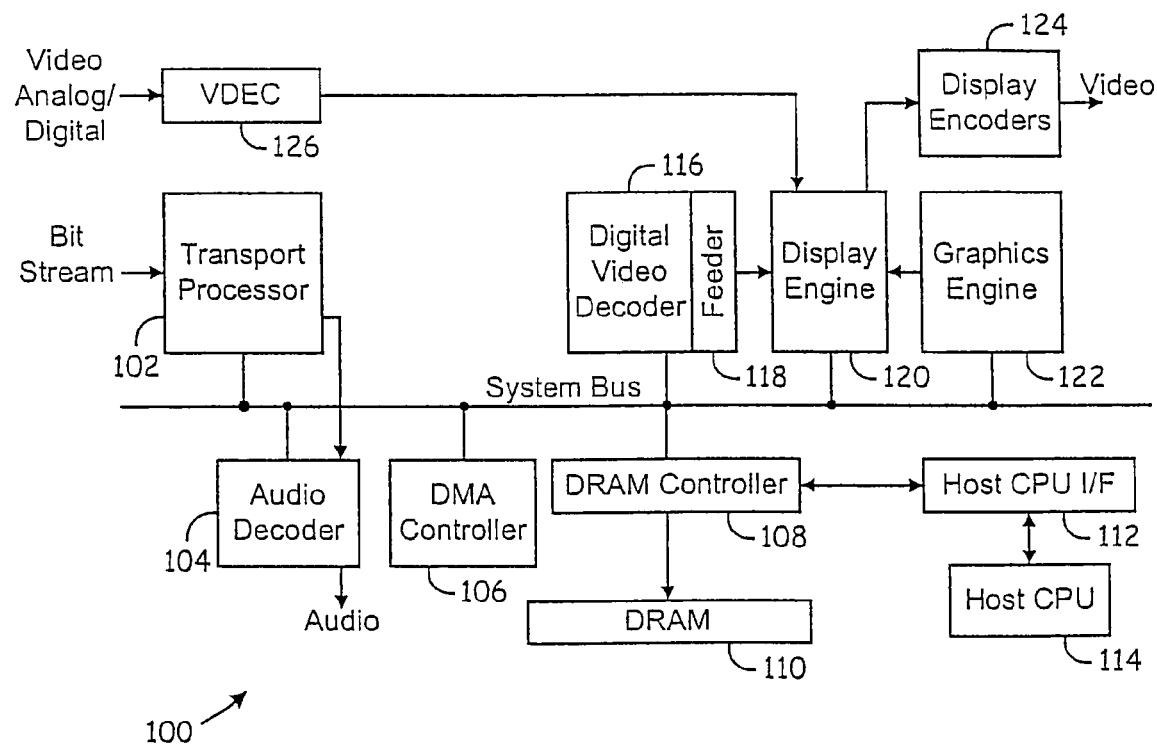
FIG. 1 is a functional block diagram of a digital media system in which the present invention may be illustratively employed.

FIG. 1 is a functional block diagram of a digital media system in which the present invention may be illustratively employed. It will be noted, however, that the present invention can be employed in systems of widely varying architectures and widely varying designs.

The digital media system of FIG. 1 includes transport processor 102, audio decoder 104, direct memory access (DMA) controller 106, system memory controller 108, system memory 110, host CPU interface 112, host CPU 114, digital video decoder 116, display feeder 118, display engine 120, graphics engine 122, display encoders 124 and analog video decoder 126. The transport processor 102 receives and processes a digital media data stream. The transport processor 102 provides the audio portion of the data stream to the audio decoder 104 and provides the video portion of the data stream to the digital video decoder 116. In one embodiment, the audio and video data is stored in main memory 110 prior to being provided to the audio decoder 104 and the digital video decoder 116. The audio decoder 104 receives the audio data stream and produces a decoded audio signal. DMA controller 106 controls data transfer amongst main memory 110 and memory units contained in elements such as the audio decoder 104 and the digital video decoder 116. The system memory controller 108 controls data transfer to and from system memory 110. In an illustrative embodiment, system memory 110 is a dynamic random access memory (DRAM) unit. The digital video decoder 116 receives the video data stream, decodes the video data and provides the decoded data to the display engine 120 via the display feeder 118. The analog video decoder 126 digitizes and decodes an analog video signal (NTSC or PAL) and provides the decoded data to the display engine 120. The graphics engine 122 processes graphics data in the data stream and provides the processed graphics data to the display engine 120. The display engine 120 prepares decoded video and graphics data for display and provides the data to display encoders 124, which provide an encoded video signal to a display device.

Aspects of an illustrative embodiment of the present invention relate to the architecture of digital video decoder 116. However aspects of the present invention can also be employed in decoders of other types of media, for example, audio decoder 104.

Figure 2:
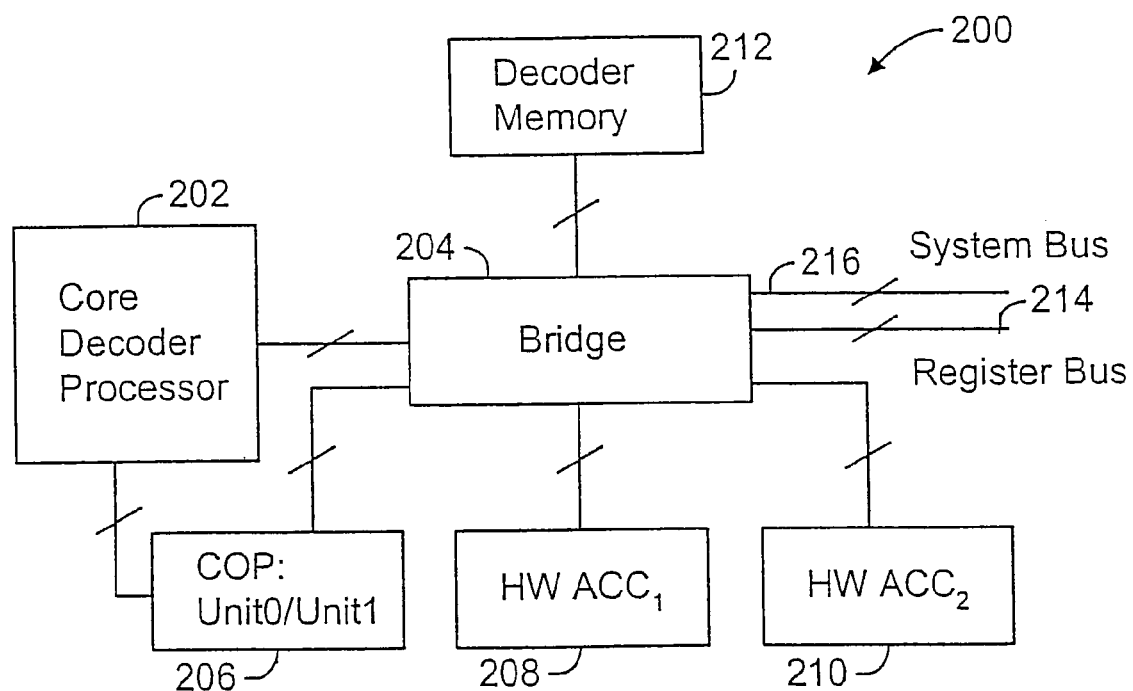
FIG. 2 is a functional block diagram of a decoding system according to an illustrative embodiment of the present invention.
Figure 3:
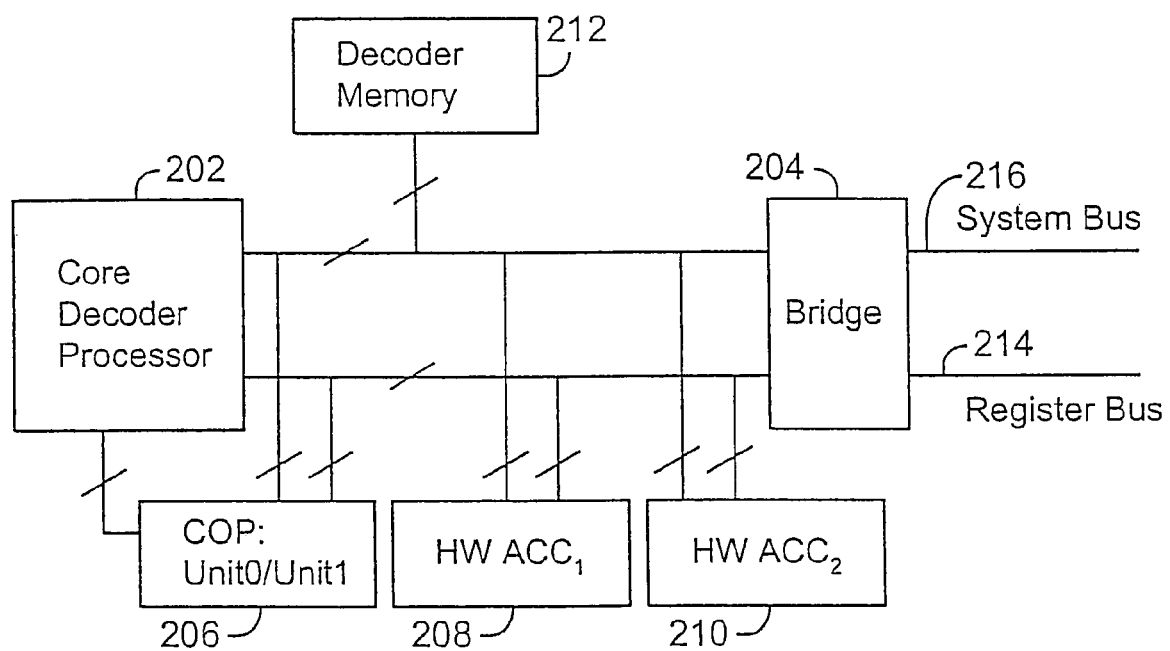
FIG. 3 is a functional block diagram of a decoding system according to an illustrative embodiment of the present invention.

FIG. 2 is a functional block diagram of a media decoding system 200, according to an illustrative embodiment of the present invention. The digital media decoding system 200 of FIG. 2 can illustratively be employed to implement the digital video decoder 116 of FIG. 1, or, alternatively, to implement audio decoder 104. Decoding system 200 includes a core decoder microprocessor 202, bridge module 204, co-processor 206, two hardware accelerators 208 and 210, decoder memory module 212, register bus 214 and system bus 216. Register bus 214 and system bus 216 communicate with the external host 114 and main memory 110. The bridge module 204 includes direct memory access (DMA) functionality. In an illustrative embodiment, the bridge module 204 is a "switch center" to arbitrate and interface between different modules. In an alternative embodiment, the bridge module 204 operates such that buses connect different modules directly, as shown in FIG. 3.

The acceleration modules 208 and 210 are hardware accelerators that accelerate special decoding tasks that would otherwise be bottlenecks for real-time media decoding if these tasks were handled by the core processor 202 alone. This helps the core processor 202 achieve the required performance. In an illustrative embodiment, the co-processor 206 is also a hardware accelerator that communicates with the core processor 202 via a co-processor interface of the core processor 202. In an illustrative embodiment wherein the decoding system 200 is a video decoding system, the co-processor 206 is a variable-length decoder, and the acceleration modules perform one or more video decoding tasks, such as inverse quantization, inverse discrete cosine transformation, pixel filtering, motion compensation and deblocking. The system of FIGS. 2 and 3 are illustrative only. In accordance with the present invention, the decoding system 200 can have any number of hardware accelerators.

The core processor 202 is the central control unit of the decoding system 200. In an illustrative embodiment of the present invention, the core processor 202 receives the data units from the bitstream to be decoded. The core processor 202 prepares the data for decoding. In an embodiment wherein the data being decoded is video data, the data unit comprises macroblock coefficient data. The core processor extracts the data for each data unit. After extracting the data for each data unit, the core processor 202 illustratively deposits the data in decoder memory 212. In an alternative embodiment, the core processor 202 provides the data directly to the co-processor 206 for processing by the co-processor 206. The core processor 202 also orchestrates a data unit processing pipeline (such as a macroblock processing pipeline) for the acceleration modules 206, 208 and 210 and fetches the required data from main memory 110 via the bridge module 204. The core processor 202 also handles some data processing tasks. Where decoding system 200 is a video decoding system, picture level processing, including sequence headers, GOP headers, picture headers, time stamps, macroblock-level information, except the block coefficients, and buffer management, are performed directly and sequentially by the core processor 202, without using the accelerators 206, 208, 210, except for using a variable-length decoder 206 to accelerate general bitstream parsing. In an illustrative embodiment of the present invention, the core processor 202 is a MIPS processor, such as a MIPS32 implementation, for example.

The co-processor 206 retrieves data that was placed in decoder memory 212 by the core processor 202 and performs one or more decoding functions on the retrieved data. In an alternative embodiment, the co-processor 206 receives the data to be processed directly from the core processor 202. After processing the received data, the co-processor 206 deposits the processed data in decoder memory 212. The data (such as DCT coefficients) deposited in decoder memory 212 by the co-processor 206 are processed by hardware accelerator module 208. After processing the data, hardware accelerator 208 deposits the processed data in decoder memory 212. The data deposited in decoder memory 212 by hardware accelerator 208 are processed by hardware accelerator module 210. After processing the data, hardware accelerator 210 deposits the processed data in decoder memory 212.

The bridge module 204 arbitrates and moves data between decoder memory 212 and main memory 110. The bridge interface 204 includes a direct memory access (DMA) engine. The bridge interface 204 illustratively includes an internal bus network that includes arbiters and the DMA engine. The bridge module 204 serves as an asynchronous interface to the system buses.

Decoder memory 212 is used to store data unit data and other time-critical data used during the decoding process. Each hardware block 206, 208, 210 accesses decoder memory 212 to either read the data to be processed or write processed data back. In an illustrative embodiment of the present invention, all currently used data is stored in decoder memory 212 to minimize access to main memory. The co-processor 206 and hardware accelerators 208 and 210 use the decoder memory 212 as the source and destination memory for their normal operation. Each module accesses the data in decoder memory 212 as the data units (such as macroblock data units) are processed through the system. In an illustrative embodiment, decoder memory 202 is a static random access memory (SRAM) unit. The CPU 114 has access to decoder memory 212, and the bridge module 204 can transfer data between decoder memory 212 and the main system memory (DRAM) 110. The arbiter for decoder memory 212 is in the bridge module 204.

Figure 4:
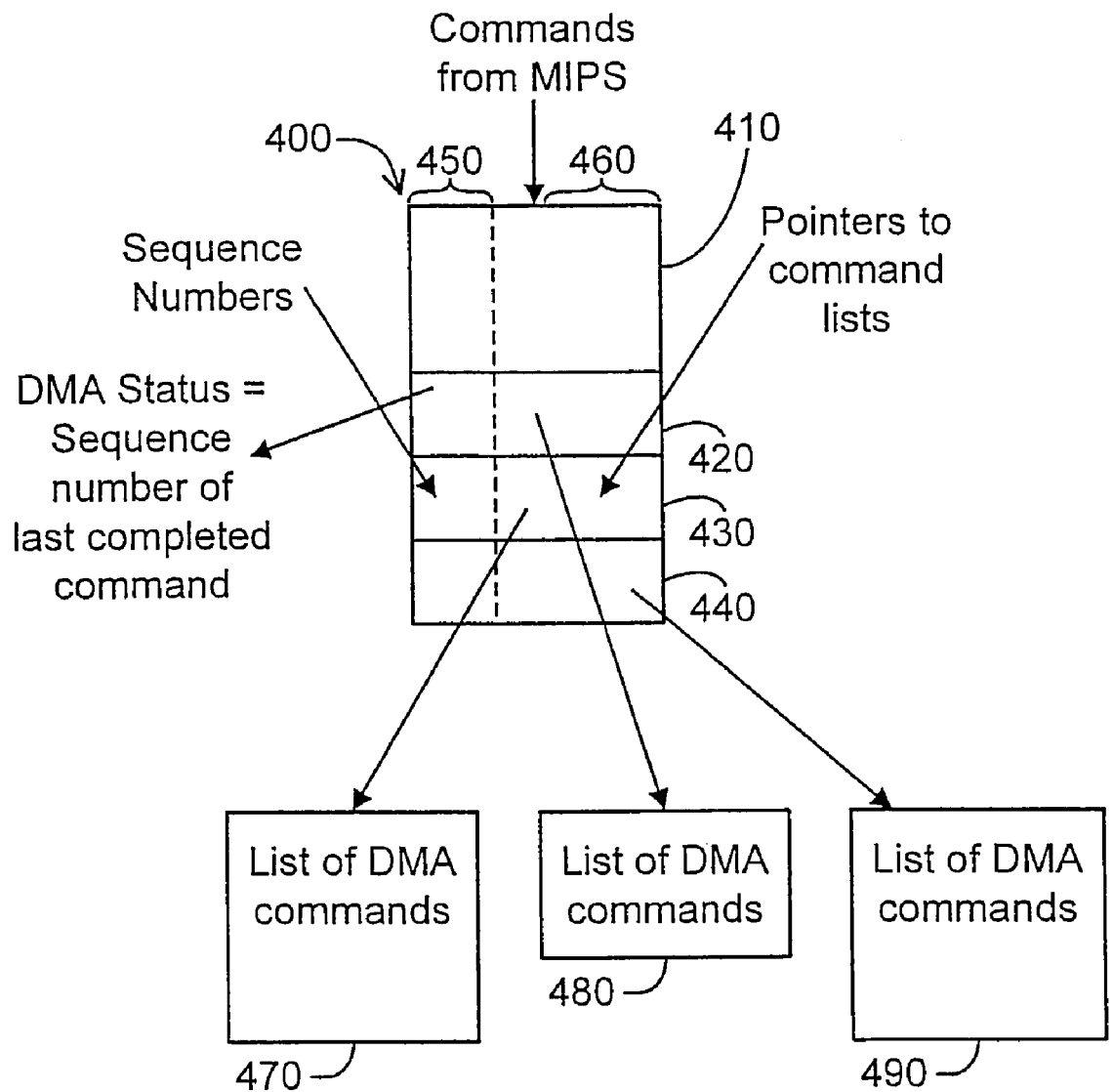
FIG. 4 is a functional block diagram depicting a command structure of DMA engine according to an illustrative embodiment of the present invention.

FIG. 4 is a functional block diagram depicting a command structure of DMA engine 204 according to an illustrative embodiment of the present invention. There can be any number of lists 470, 480, 490 of DMA commands placed in decoder memory 212. Each command list 470, 480, 490 has at least one command, and the commands are all sequential in memory, with an indication as to which command is the last command in a given list. In an illustrative embodiment, the command lists 470, 480, 490 are not linked lists, they are just lists. There is also a command queue 400 in the DMA (in the bridge 204) itself. Each entry 410, 420, 430, 440 in the command queue 400 has two fields: a pointer 460 to a command list 470, 480, 490 and a sequence number 450. Entries are pushed onto the queue by the core processor 202 writing to a single queue input address. The DMA engine 204 takes the commands off the queue 400 in FIFO order and performs the operations specified by the commands in the command list (such as list 470, 480 or 490) that is pointed to by the command queue entry (such as 410, 420, 430, 440). Once one list 470, 480, 490 has been completed, the DMA goes to the list 470, 480, 490 pointed to by the next entry 410, 420, 430, 440 in the queue 400. After all of the commands (in a list such as list 470, 480 or 490) corresponding to an entry (such as 410, 420, 430 or 440) in the queue 400 have been completed, the sequence number of that entry is sent to a DMA Status output port, which is available to the core processor 202 as part of the central status register. Firmware on the core processor 202 creates the sequence numbers. By policy, the sequence numbers should be sequential, i.e., increasing modulo 16 (0, 1, 2, ..., 15, 0, ...). With sequence numbers, the firmware can identify, at any time, which entry in the queue 400, i.e., which list (470, 480, 490) of DMA commands, has been completed. This is very beneficial if the list of commands spans more than one MBlock time.

Each DMA command, in the lists, should be as compact as possible, while providing the required functionality. According to an illustrative embodiment of the present invention, each command fits into two 32-bit words, with one word (e.g., the second) containing the DRAM address for the transfer, and the other word (first) containing bits for: direction of transfer, start address in SRAM/module; two bits to select which SRAM or module; special transaction type (for prediction reads); length of transfer; and whether this is the last command in the list.

Although a preferred embodiment of the present invention has been described, it should not be construed to limit the scope of the appended claims. For example, the present invention is applicable to any type of coded data, in addition to the media data illustratively described herein. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A direct memory access (DMA) system comprising:
   a memory element storing a plurality of DMA command lists, at least one of said lists comprising more than one DMA command;
   a command queue operable to hold a plurality of entries, each entry comprising a pointer field and a sequence field, the pointer field pointing to one of the DMA command lists, the sequence field holding a sequence value indicative of a sequential placement of said entry in the command queue; and
   a DMA engine operable to access an entry in the command queue and to access the DMA commands of the DMA command list pointed to by the pointer field of the accessed entry, the DMA engine further operable to perform DMA operations specified by the accessed DMA commands.

2. The DMA system of claim 1 wherein the command queue is included in the DMA engine.

3. The DMA system of claim 1 wherein a last DMA command in each command list includes an indication that it is the last command in the list.

4. The DMA system of claim 1 further comprising a processor operable to provide the entries to the command queue in order to effect the performance of corresponding DMA operations.

5. The DMA system of claim 4 wherein the DMA engine is operable to provide the sequence value to the processor when all of the DMA commands in the accessed command list have been performed.

6. The DMA system of claim 1 wherein when all of the DMA commands in the accessed command list have been performed, the DMA engine is operable to access a next entry in the command queue and to access the DMA commands of the DMA command list pointed to by the pointer field of the accessed entry, the DMA engine further operable to perform DMA operations specified by the accessed DMA commands, the DMA engine further operable to make available the sequence value held in the sequence field of the accessed entry when all of the DMA commands in the accessed command list have been performed.

7. The DMA system of claim 1 wherein the memory element is a static RAM memory element.

8. A method of implementing direct memory access (DMA) comprising:
   storing a plurality of DMA command lists, at least one of said lists comprising more than one DMA command;
   maintaining a command queue adapted to hold a plurality of entries, each entry comprising a pointer field and a sequence field, the pointer field pointing to one of the DMA command lists, the sequence field holding a sequence value indicative of a sequential placement of said entry in the command queue;
   accessing an entry in the command queue;
   accessing the DMA commands of the DMA command list pointed to by the pointer field of the accessed entry; and
   performing DMA operations specified by the accessed DMA commands.

9. The method of claim 8 wherein a last DMA command in each command list includes an indication that it is the last command in the list.

10. The method of claim 8 wherein a processor provides the entries to the command queue in order to effect the performance of corresponding DMA operations.

11. The method of claim 10 further comprising providing the sequence value to the processor when all of the DMA commands in the accessed command list have been performed.

12. The method of claim 8 wherein the plurality of DMA command lists are stored in a static RAM memory element.

13. The method of claim 8 further comprising:
   when all of the DMA commands in the accessed command list have been performed, accessing a next entry in the command queue;
   accessing the DMA commands of the DMA command list pointed to by the pointer field of the accessed entry;
   performing DMA operations specified by the accessed DMA commands; and
   making available the sequence value held in the sequence field of the accessed entry when all of the DMA commands in the accessed command list have been performed.

14. A digital media processing system comprising:
   a memory element storing a plurality of direct memory access (DMA) command lists, at least one of said lists comprising more than one DMA command;
   a command queue operable to hold a plurality of entries, each entry comprising a pointer field and a sequence field, the pointer field pointing to one of the DMA command lists, the sequence field holding a sequence value indicative of a sequential placement of said entry in the command queue;
   a media processor operable to process digital media data elements and operable to provide entries to the command queue in order to effect the performance of corresponding DMA operations, each entry corresponding to a specified media data element; and
   a DMA engine operable to access an entry in the command queue and to access the DMA commands of the DMA command list pointed to by the pointer field of the accessed entry, the DMA engine further operable to perform DMA operations specified by the accessed DMA commands.

15. The digital media processing system of claim 14 wherein the command queue is included in the DMA engine.

16. The digital media processing system of claim 14 wherein a last DMA command in each command list includes an indication that it is the last command in the list.

17. The digital media processing system of claim 14 wherein when all of the DMA commands in the accessed command list have been performed, the DMA engine is operable to access a next entry in the command queue and to access the DMA commands of the DMA command list pointed to by the pointer field of the accessed entry, the DMA engine further operable to perform DMA operations specified by the accessed DMA commands, the DMA engine further operable to provide the sequence value held in the sequence field of the accessed entry to the media processor when all of the DMA commands in the accessed command list have been performed.

18. The digital media processing system of claim 14 wherein the memory element is a static RAM memory element.

19. The digital media processing system of claim 14 wherein the media processor is a video processor adapted to process digital video data elements and operable to provide entries to the command queue in order to effect the performance of corresponding DMA operations, each entry corresponding to a specified video data element.

20. The digital media processing system of claim 19 wherein the video processor is operable to process macroblock data elements and adapted to provide entries to the command queue in order to effect the performance of corresponding DMA operations, each entry corresponding to a specified macroblock data element.

* * * * *